United States Patent [19]

Robar

[11] 4,441,101

[45] Apr. 3, 1984

[54] GRAIN SENSOR

[75] Inventor: James D. J. Robar, Saskatoon, Canada

[73] Assignee: SED Systems Inc., Saskatoon, Canada

[21] Appl. No.: 313,565

[22] Filed: Oct. 22, 1981

[30] Foreign Application Priority Data

Nov. 7, 1980 [CA] Canada ................................ 346228

[51] Int. Cl.$^3$ .............................................. G01F 1/05
[52] U.S. Cl. ................................... 340/606; 340/609; 73/861.18; 73/861.73; 310/327
[58] Field of Search ............... 340/606, 609, 610, 615; 73/861.18, 861.21, 861.73, 861.74; 310/327, 333, 345

[56] References Cited

U.S. PATENT DOCUMENTS

| | | | |
|---|---|---|---|
| 2,561,763 | 7/1951 | Waters et al. ........................ | 340/606 |
| 2,907,015 | 9/1959 | Young .................................. | 340/609 |
| 3,557,616 | 1/1971 | Landon, Jr et al. ............... | 73/861.73 |
| 3,816,773 | 6/1974 | Baldwin et al. .................. | 73/861.73 |
| 3,969,927 | 7/1976 | Yoshida et al. ..................... | 310/327 |
| 4,079,362 | 3/1978 | Grimm et al. ...................... | 310/345 |
| 4,312,235 | 1/1982 | Daigle .............................. | 73/861.18 |
| 4,351,192 | 9/1982 | Toda et al. ...................... | 73/861.18 |

FOREIGN PATENT DOCUMENTS 509911 2/1955 Canada .
1081822 7/1980 Canada .

*Primary Examiner*—Gerald L. Brigance
*Attorney, Agent, or Firm*—Alan H. Levine

[57] ABSTRACT

A seed flow detector for use with a seed tube, comprised of a pin for extending radially into the seed tube, the end of the pin being orthogonally fixed to one face of a piezoelectric crystal transducer. Flexible resilient material is disposed against the other face of the transducer so as to damp mechanical vibrations below a predetermined frequency. Substantially no build-up of seeds or blockage of the seed tube results, mechanical vibration is substantially damped, while signals resulting from the impact of seeds against the pin are reliably generated.

16 Claims, 4 Drawing Figures

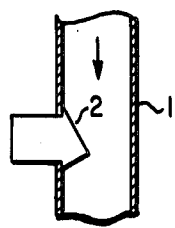
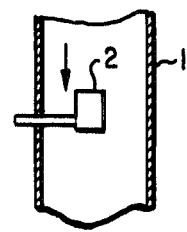
FIG. 1A
PRIOR ART
FIG. 1B
PRIOR ART
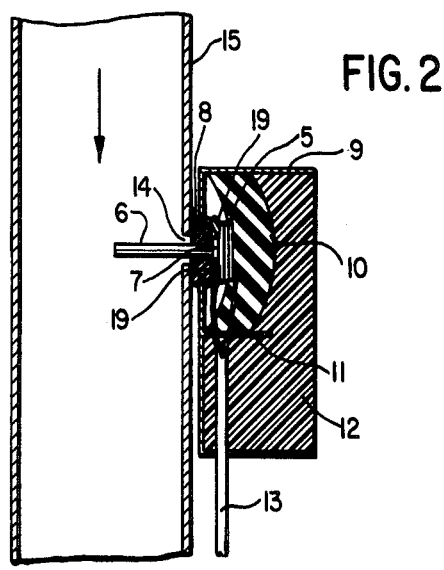
FIG. 2
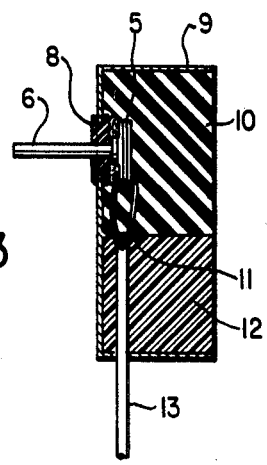
FIG. 3

GRAIN SENSOR

This invention relates to equipment for sensing the flow of granular material, and is particularly useful for sensing the flow of seeds in a seed tube.

Agricultural seeding equipment commonly is made up of one or more bins in which seeds are stored, the bins being connected via seed tubes to orifices which are speced along a draw bar and are located just above rows of cleaved field earth to be planted. The seeds are either gravity fed or are blown down the seed tubes.

It is important for the seeding equipment operator to be able to detect that a continuous flow of seeds progresses down each seed tube, since the seed tubes can sometimes become blocked, or a bin can become empty. When these circumstances arise, seed flow stops and areas of the field remain unplanted, reducing the efficiency of utilization of the field.

In order to detect the flow of seeds, a microphone is sometimes used within each trunk tube which feeds seeds to the seed tubes. A proportion of the seeds flowing through each tube hit the microphone, generating pulses which are used to drive indicating apparatus located adjacent the operator.

It has been found that a microphone located within a seed tube restricts the flow of seeds an undesirable extent, sometimes causing a build up of seeds, and thus itself causing blockage of the tube. Further, the face of the microphone has been found to become covered with seeds, dust, etc., which absorbs the energy of the impact of subsequent seeds, reducing the amplitude of the resulting output signal from the microphone.

Photocells have also been used to sense the flow of seeds passing through a light beam, but this type of structure has been found to fail when the light source and/or photocell becomes covered with dust, dirt or chemicals.

The present invention has been found to overcome the above-noted problems. A pin, preferably having a circular cross-section, extends into the seed tube. The diameter of the pin should be small relative to the diameter of the seed tube, and preferably as small as possible consistent with maintaining its stiffness. The pin is fixed to one face of a piezoelectric crystal, the structure being fabricated such that frequencies below about 10 KHz are substantially damped. This substantially reduces the effect of vehicle vibration on the piezoelectric crystal.

A portion of the seeds passing down the seed tube hit the pin, causing an output signal in the form of a ringing signal, at the resonant frequency of the crystal, to be produced. The signal can be detected and an indicator operated to indicate the presence of seed flow.

Since the diameter of the pin is small relative to the diameter of the seed tube, and since the surface of the pin against which the seed impacts is sloped relative to a horizontal plane due to the circular cross-section thereof, there is virtually no chance for seeds to build up on it and block the seed tube.

Microphone sensors used in the past have been so large that they could not be used with actual seed tubes, and were required to be used in the feeder or plenum down which the seeds pass. However, such feeders are connected to a plurality of seed tubes, and if only one or fewer than all the seed tubes clog, there would still be a flow of seeds through the feeder or plenum, thus giving a false indication to the operator that the seeder is operating properly. The present invention can be used for the first time in an actual seed tube itself, thus monitoring the actual seed flow in each seeder tube. Should a single seed tube become blocked or fail to function, this will be immediately sensed by the corresponding sensor, which is transmitted to the seeder operator.

In general, the invention is a grain sensor comprising a pin, a sensing structure for detecting impacts against the pin, and means for damping vibration of the pin below a predetermined frequency. Preferably the pin has a circular cross-section, so that a sloping surface to the horizontal on the (upper) impact surface should be provided whereby grain will slide or bounce off and not build up.

The sensor is disposed against the side of a seed tube, with the pin extending through a hole in the side of the seed tube, where it is exposed to the flow of grain to the seeding orifice.

Impacts against the pin are preferably detected by a piezoelectric crystal having one face fixed to the end of the pin outside the seed tube. The damping structure is comprised of a mass of closed cell neoprene having a compressibility of about 50% under a pressure of about 2–5 pounds per square inch in pressure contact with the opposite face of the crystal. As a result, mechanical vibration, e.g., under 10 KHz, is substantially damped.

The pin passes through a resilient grommet which is held in a hole in the front wall of a housing, the pin passing through the grommet in resilient peripheral contact therewith. A flexible adhesive material is disposed between the face of the crystal to which the end of the pin is connected and the grommet. The closed cell resilient material bears against the opposite face of the crystal, and can surround the remainder of the crystal within the housing.

The description of the invention herein generally refers to use of the structure in a seed tube for detection of the flow of seeds. However it is intended that the description should be construed as being applicable to detection of various kinds of granular material, such as seeds, granular types of fertilizer, etc. The term "grain" is intended to be construed to have a broad and inclusive meaning.

A better understanding of the invention will be obtained by reference to the detailed description below, and to the following drawings, in which:

FIGS. 1A and 1B are representative cross-sections of prior art grain sensors disposed within seed feeder tubes;

FIG. 2 is a cross-section of one embodiment of the present invention, and

FIG. 3 is a cross-section of another embodiment of the present invention.

In FIG. 1A, a seed feeder tube 1 is shown, seeds passing through it in the direction shown by the arrow. A microphone 2 is located within the seed tube 1, and is disposed with its face typically at a 45° angle to the direction of seed flow. The microphone face is at an angle so that there will be a reduced tendency for seeds and debris to build up on its surface.

However, it will be seen that the microphone takes up a significant area of the cross-section of the seed feeder tube. Consequently chemicals, dust, dirt and seeds have been found to build up on its broad surface area, eventually providing a "soft", energy absorbing surface. The impact of further seeds on this soft surface results in a low amplitude or absent signal output from the microphone.

Further, when the build-up noted above occurs, eventually considerable or total blockage of the seed feeder tube can occur. Consequently substantial cleaning maintenance of the seed feeder tube and microphone is required.

FIG. 1B is a cross-section of a seed tube in which a microphone of a different type is used. This microphone is similar to one described in Canadian Pat. No. 1,055,144 issued May 22, 1979. The sensitive upper surface of the microphone faces the direction of seed flow, in order to obtain maximum impact energy from the seeds.

However, since the face of the microphone is horizontal, it is clear that dust, dirt, chemicals and seeds can build up on its upper surface at a rapid rate, deteriorating its operation.

The diameter of the surface of both microphones described above is a significant fraction of the diameter of the seed feeder tube, thus increasing the probability of blockage.

A side cross-section of one embodiment of the present invention is shown in FIG. 2. A piezeoelectric transducer 5 has a pin 6 fixed orthogonally to one face 7. The pin passes through the central hole of a resilient grommet 8, which is held in a hole of a housing 9. The pin 6 passes through the grommet 8 in peripheral contact therewith, preferably stretching the grommet slightly. The grommet should of course be made of a resilient material such as rubber.

The face of the piezoelectric transducer adjacent the grommet is made adherent thereto by filling the space with a flexible adhesive material such as SILASTIC RTV TM silicone rubber available from Dow Corning Ltd.. A closed cell resilient material 10 surrounds the remainder of the crystal between the housing. Preferably the closed cell resilient material should be neoprene, having a compressibility of 50% under a pressure of 2 to 5 pounds per square inch. Such material can be selected from the group consisting of types R-421-N TM, R-411-N TM and R-415-N TM closed cell black neoprene available from Rubatex Products, Hamilton, Ontario, Canada. The material shown is provided as a sheet which is wedged into place in the housing.

In this embodiment, a portion of the housing segregating the piezoelectric crystal is divided from the remainder of the housing by means of a wall 11, and the remainder of the housing above the resilient material and in the portion outside the segregated area can be filled with a potting compound 12, such as epoxy. The two leads of a cable 13 are connected to the opposite faces of the crystal, and are drawn with strain relief through holes in wall 11, through the potting compound 12 and a hole to the outside of the housing.

The grommet preferably is made out of rubber since it transmits only low vibrational frequencies from the carriage apparatus. These low frequencies are absorbed by the closed cell neoprene used behind the piezoelectric crystal.

A piezoelectric crystal which was found to operate successfully was thin and flat, with a square face configuration dimensioned about 0.3 inches to a side, giving a surface area of about 0.1 square inches. The diameter of the pin was about 0.1 inches, and its length about 0.75 inches. The end of the pin was flattened to a diameter of about 0.25 inches in order to provide a larger adherent surface in contact with the surface of the piezoelectric crystal.

The pin 6 protrudes throught a hole 14 in a seed tube 15. It was noted earlier that the pin 6 should have a diameter which is small relative to the diameter of the seed tube. The housing is retained in position using any convenient means, such as a bracket, clamp, etc. (not shown).

In operation, seeds or other granular material pass down the seed tube 15 in the direction of the arrow. A portion of the seeds hit the pin, causing vibration of the pin 6, which vibration is transmitted to piezoelectric transducer 5. The transducer generates an output voltage which can be detected across the leads of cable 13.

It should be noted that the function of the closed cell resilient material 10 is to absorb vibrational energy transmitted to the piezoelectric transducer which is mechanical in origin resulting from vibration of the apparatus rather than of the pin 6 from seeds hitting it. It has been found that such vibrational energy is normally below 10 KHz, and the specific kinds of closed cell resilient material noted above absorbs a substantial amount of energy below 10 KHz. Accordingly the structure forms an absorption filter below 10 KHz.

It has been found for metal pins of aluminum or other relatively light material, the vibrational energy caused by impact of seeds is between about 10 KHz–50 KHz. A successful transducer which was used was a piezoelectric crystal having a resonance of about 43 KHz. However it is preferred that this should be lowered to a value about mid-way between the lower and upper vibrational frequencies received from impact by a seed.

The preferred form of pin has a circular cross-section. In general it is desirable that the surface of the pin which faces the direction from which the seeds come is at an angle to the horizontal, without any flat or concave upward facing surfaces providing a ledge which could catch dust, liquid, or gummy material. Thus when a seed or grain of other material hits the pin, it is deflected sideways.

The output signal from cable 13 can be used in an apparatus which provides an indication to an operator that seeds are flowing through the seed tube at a particular rate, since the frequency of generation of the output signal "hits" will be proportional to the rate of flow of the seeds.

While the invention has been described using a piezoelectric crystal transducer, a different form of transducer can be used using the concepts of this ivnention. The pin extends into the seed tube and vibration caused by impact of seeds thereon are transmitted to the transducer. The transducer should be damped or isolated from its supporting structure so that mechanical vibration energy below a predetermined frequency does not cause substantial output signals to be generated.

FIG. 3 is a side cross-section of a grain sensor which is a variation of the embodiment shown in FIG. 2. The structure of the pin 6, grommet 8, piezoelectric transducer 5, flexible adhesive material 19 and housing 9 are similar to that shown in FIG. 2. However in FIG. 2 the closed cell resilient material was provided as a fixed sheet wedged in between wall 11 and the outside wall of the housing 9 and against the transducer 5, with the potted area enclosing the closed cell resilient material behind the piezoelectric transducer.

In FIG. 3 the housing behind the piezoelectric transducer 5 is filled with the closed cell resilient material 10. The material can be formed in place, surrounding the sides to the front wall of the housing 9, whereas in FIG.

2 the closed cell resilient material was added as a preformed strip or matt and placed behind the transducer.

If desired, a short wall 11 of the housing through which cable 13 passes, can be used as a strain relief, the material 10 filling the housing to the plane of wall 11. The remainder of the housing 9 is then filled with potting compound 12, forming a potted area which further encloses and holds cable 13.

The desirability of using one or the other of the embodiments of FIG. 2 or 3 will depend on the most economical manufacturing technique available to the fabricator.

It has been found that the structure described above has a substantially reduced tendency to clog, and reduces the requirement of frequent cleaning. Yet it provides a reliable and satisfactory indication of the volume of seeds or grains of other material passing through the tube with which it is used, in sharp contrast with the previously required broad surface area microphones which were required to detect seeds or grains passing down a tube, with the attendant clogging problem, and use only in relatively wide seed feeder tubes.

A person skilled in the art understanding this invention may now conceive of other embodiments or modifications, using the principles described herein. All are considered within the sphere and scope of the invention as defined in the claims appended hereto.

The embodiments of the invention in which an exclusive property or privilege is claimed are defined as follows:

1. A grain sensor comprising a thin piezoelectric crystal having a pair of opposite faces, a pair of output wires connected to said faces, a pin fixed orthogonally to a central region of one of the faces, a housing including a front wall having a hole therethrough, a resilient grommet held in the hole in said wall, the pin passing through said grommet in peripheral and resilient contact therewith, said crystal being disposed within the housing, flexible adhesive material disposed between said one face of the crystal and the grommet, and closed cell resilient material disposed against the other face of the crystal within the housing, said closed cell resilient material acting as a high pass mechanical filter.

2. A grain sensor as defined in claim 1, in which the closed cell resilient material is neoprene.

3. A grain sensor as defined in claim 1 in which the closed cell resilient material is neoprene having a compressibility of 50% under a pressure a 2 to 5 pounds per square inch.

4. A grain sensor as defined in claim 1, 2 or 3 in which the closed cell resilient material is selected from the group of materials consisting of Types R-421-N TM, R-411-N TM and R-415-N TM closed cell black neoprene.

5. A grain sensor as defined in claim 1, 2 or 3, in which the flexible adhesive material is Silastic RTV TM silicone rubber.

6. A grain sensor as defined in claim 1, 2 or 3 further including a potting compound substantially filling the housing around the closed cell resilient material.

7. A grain sensor as defined in claim 1, 2 or 3, further including a grain tube adapted to guide the flow of dispersed granular material, a hole in the side of the grain tube, said pin extending radially through the hole of the grain tube into the grain tube, the diameter of the pin being small relative to the diameter of the grain tube.

8. A grain sensor as defined in claim 1, 2 or 3, further including a grain tube adapted to guide the flow of dispersed granular material, a hole in the side of the grain tube, said pin extending radially through the hole of the grain tube into the grain tube, the diameter of the pin being small relative to the diameter of the grain tube, the length of the pin extending within the grain tube being a significant fraction of the diameter of the grain tube.

9. A grain sensor as defined in claim 3, in which the closed cell resilient material is selected from the group consisting of type R-421-N TM, R-411-N TM and R-415-N TM closed cell black neoprene, the flexible adhesive material is Silastic RTV TM silicon rubber, and further including potting compound substantially filling the housing around the closed cell resilient material.

10. A grain sensor as defined in claim 1, 2 or 3 in which the piezoelectric crystal is thin and flat and each face thereof has an area of about 0.1 square inch, and the pin has a diameter of about 0.1 inches.

11. A grain sensor as defined in claim 1, 2 or 3 in which the piezoelectric crystal is thin and flat and each face thereof has an area of about 0.1 square inch, the pin has a diameter of about 0.1 inches and a length of about 0.75 inch.

12. A grain sensor comprising a pin, a piezoelectric crystal having one face fixed to the end of the pin for detecting impacts against the pin, and means for damping vibration of the pin below a predetermined frequency, said means for damping being comprised of a bed of resilient material in pressure contact with the opposite face of said crystal.

13. A grain sensor as defined in claim 12, in which the bed of resilient material is comprised of closed cell neoprene having a compressibility of about 50% under a pressure of about 2 to 5 pounds per square inch.

14. A grain sensor as defined in claim 12, in which the bed of resilient material is comprised of closed cell neoprene having a compressibility of about 50% under a pressure of about 2 to 5 pounds per square inch; a grain tube adapted to guide the flow of disposed granular material, a hole in the side of the grain tube, said pin extending radially through the hole into the grain tube, the diameter of the pin being small relative to the diameter of the grain tube.

15. A seed flow sensor comprising a seed tube, a hold in the side of the seed tube, a pin having a diametric cross-section small relative to the diameter of the seed tube, means for detecting vibration of the pin comprising a piezoelectric crystal having one face fixed to the end of the pin outside the seed tube, and means for damping said vibration at frequencies transmitted by the seed tube to the pin, said means for damping comprising a mass of closed cell neoprene having compressibility of about 50% under a pressure of about 2 to 5 pounds per square inch in pressure contact with the opposite face of the crystal.

16. A seed flow sensor as defined in claim 15 in which the pin has a circular cross-section.

* * * * *